Feb. 2, 1971  R. W. WORLEY  3,559,339
COLLAPSIBLE PLANT STAKE ASSEMBLY
Filed Nov. 4, 1968  2 Sheets-Sheet 1
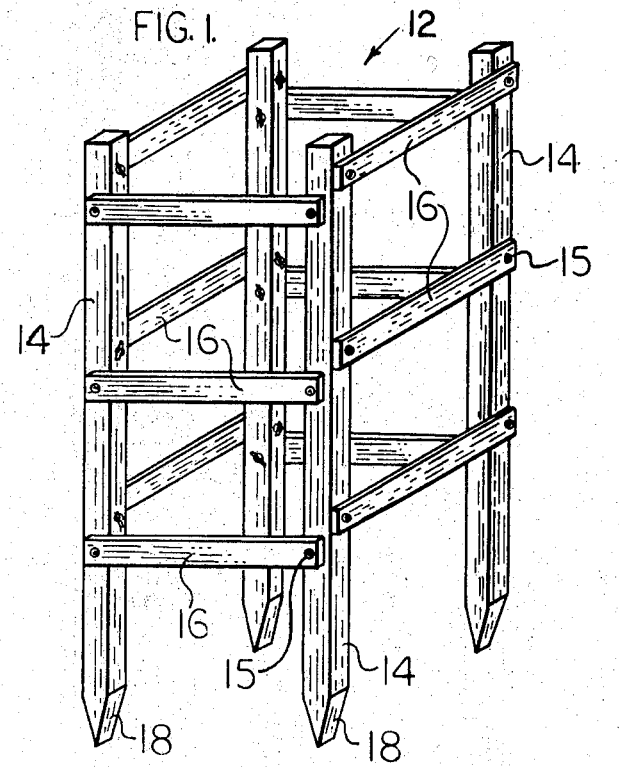
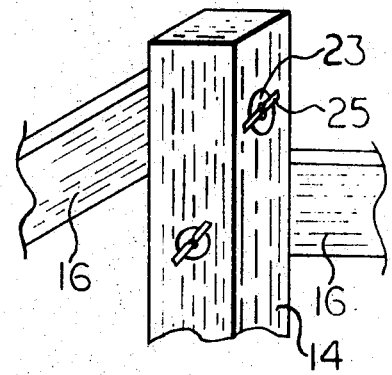
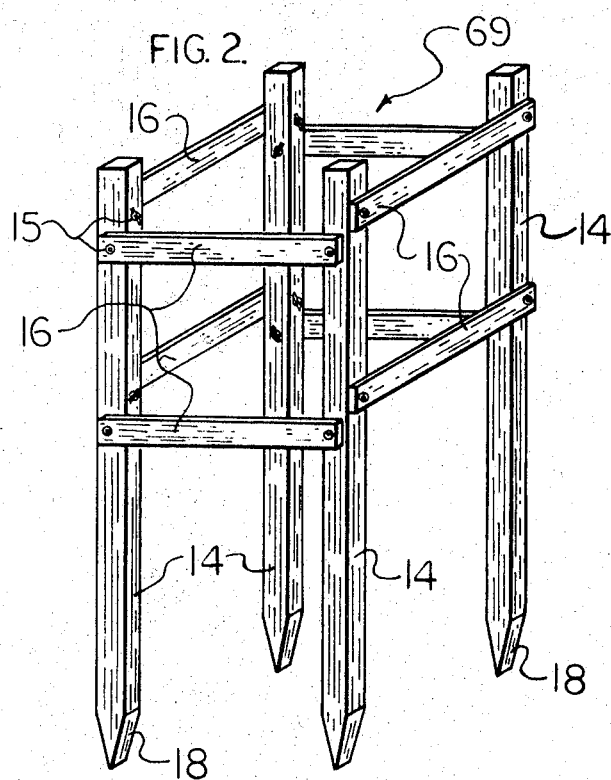
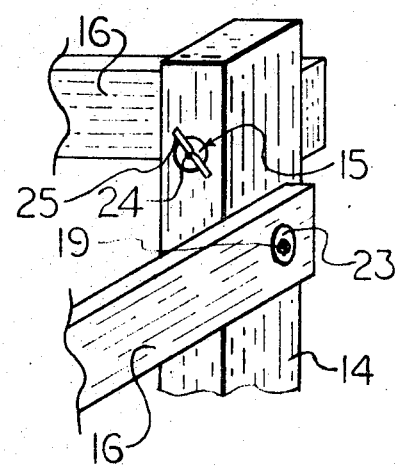
INVENTOR.
Robert W. Worley
BY
ATTORNEY

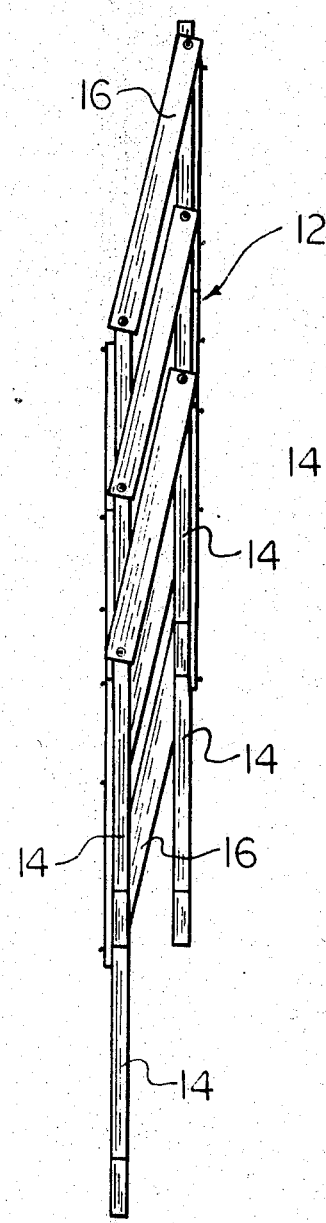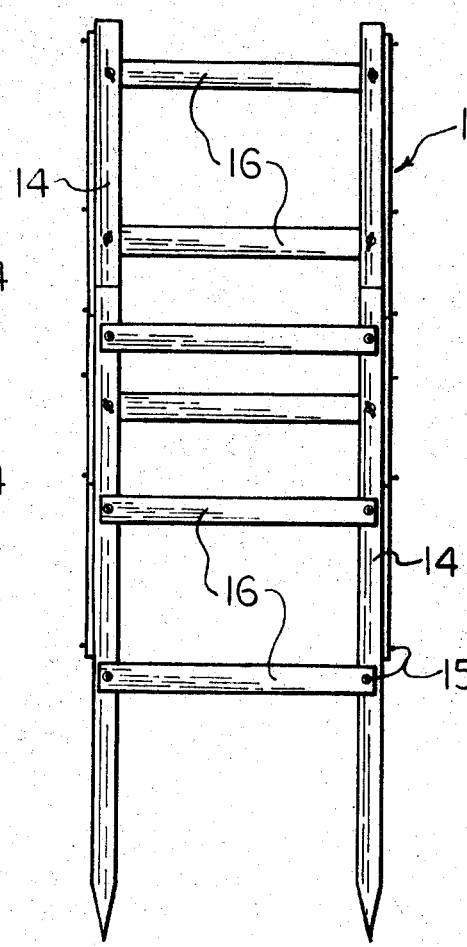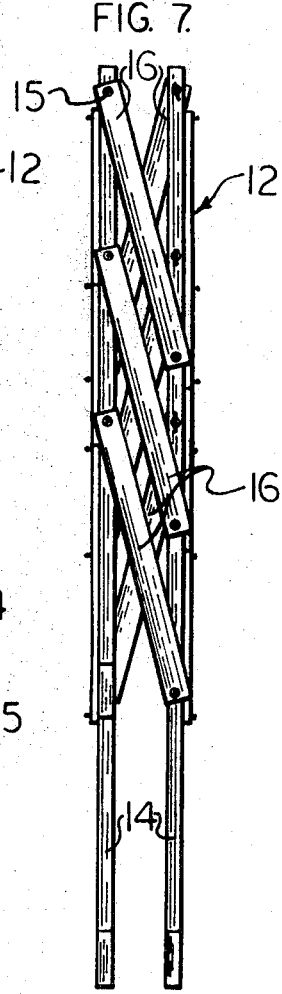

United States Patent Office 3,559,339
Patented Feb. 2, 1971

3,559,339
COLLAPSIBLE PLANT STAKE ASSEMBLY
Robert W. Worley, 426 S. Clifton,
Wichita, Kans. 67218
Filed Nov. 4, 1968, Ser. No. 773,264
Int. Cl. A01g 9/12
U.S. Cl. 47—45                                3 Claims

ABSTRACT OF THE DISCLOSURE

This invention relates to a stake assembly including a plurality of corner stakes interconnected as by lateral support or side rails so that the same may be positioned about a plant for supporting the same and readily movable into a compact, sturdy position for hanging or storing.

Numerous types of structures are provided in the prior art operable to provide support to an adjacent plant or the like; however, the prior art devices are generally complicated in structure, expensive to manufacture, and not readily movable into hanging or storage positions.

In one preferred embodiment of this invention, a collapsible plant stake assembly is provided including a plurality of upright, spaced corners posts or stakes interconnected by connecting means to a plurality of spaced side rails. Each corner post or stake is preferably of rectangular shape in transverse cross-section having one end then formed into a tapered end section so that the same is easily driven into a supporting ground surface such as the soil. The side rails are of substantially identical length and rectangular shape in transverse cross-section having opposite ends formed with respective holes for receiving the connecting means therein. The connecting means includes, at each attachment point of the side rails to respective one of the corner stakes, a pair of washer members mounted against exposed surfaces of the hole in the side rails and another hole in the respective corner stake. A cotter pin is placed through the aligned holes and anchored thereto in a conventional manner. The collapsible plant stake assembly is secured between adjacent ones of the corner stakes with three parallel side rails with adjacent sets of said side rails spaced off-set relative to each other. Another embodiment is provided wherein a dual tiered collapsible plant stake assembly is similar to the one previously described except having pairs of side rails pivotally connected to adjacent ones of the corner stakes. The off-set relationship of the side rails of both of these embodiments allows the same to be pivotally moved into a compact condition for hanging and also to another compact storage condition.

One object of this invention is to provide a collapsible plant stake assembly overcoming the aforementioned disadvantages of the prior art devices.

Another object of this invention is to provide a stake assembly including a plurality of spaced corner stakes pivotally interconnected by side rails whereupon the same is movable from a generally square shaped, cage structure to a folded or stacked condition for hanging or storage of the same.

One other object of this invention is to provide a collapsible plant stake assembly which is economical to manufacture, simple to use, sturdy in construction, and readily movable from the usage to the storage conditions.

Various other objects, advantages, and features of the invention will become apparent to those skilled in the art from the following discussion, taken in conjunction with the accompanying drawings, in which:

FIG. 1 is a perspective view of the collapsible plant stake assembly of this invention as shown in the normal usage condition;

FIG. 2 is another embodiment illustrating a dual tiered collapsible plant stake assembly of this invention;

FIG. 3 is an enlarged fragmentary elevational view of an upper area of a corner stake of the collapsible stake assembly of this invention;

FIG. 4 is a view similar to FIG. 3 illustrating an adjacent one of the corner stakes;

FIG. 5 is a side elevational view of the collapsible plant stake assembly of this invention illustrated as a dual fold condition for hanging purposes;

FIG. 6 is a side elevational view illustrating a collapsible plant stake assembly of this invention in a single fold condition for hanging purposes; and FIG. 7 is a side elevational view of the collapsible plant stake assembly as in the opposed folding condition for compact storage.

The following is a discussion and description of preferred specific embodiments of the new collapsible plant stake assembly of this invention, such being made with reference to the drawings, whereupon the same reference numerals are used to indicate the same or similar parts and/or structure. It is to be understood that such discussion and description is not to unduly limit the scope of the invention.

Referring to the drawings, in detail and in particular FIG. 1, a collapsible plant stake assembly, indicated generally at 12, is shown as positioned at an upright, open condition where the same resembles a generally square cage shape. It is noted that in this condition, the stake assembly is adapted to be placed about a tomato plant or the like whereupon the support portion can be forced downwardly into the supporting surface such as the supporting earth whereupon the tomato plant or the like can be tied to the same as normally required to obtain the proper conditions for growing tomatoes.

The collapsible plant stake assembly 12 includes a plurality of upright spaced corner posts or stakes 14, each interconnected to adjacent ones as by a connecting means 15 to a plurality of lateral supports or side rails 16. The corner stakes 14 are of an elongated nature preferably rectangular shape in transverse cross section having a flat area at one upper end with the opposite end provided with a tapered end section with opposed outwardly converging sides 18 to provide a pointed area for pushing the same within the soil during usage. It is noted that the corner stakes 14 are substantially identical in shape and length to give the uniform appearance and novel folding features of this invention.

Each side rail 16 is of identical length and preferably of rectangular shape in transverse cross section having holes 19 at opposite ends so that each side rail 16 has identical spacing of the opposed holes 19 for connecting purposes to become obvious.

The connecting means 15 includes at each connection of a respective one of the side rails 16 to a respective corner stake the following: a pair of washer members 23 and a cotter pin 25 to interconnect same to a respective side rail 16 and a corner stake 14.

In the assembly of the collapsible plant stake assembly 12, it is seen that adjacent pairs of the cornerstakes 14 are interconnected as by three parallel side rails 16 placed against the outer surface thereof to align the respective holes 19 in the side rails 16 with respective holes 24 in the corner stakes 14. Thereupon, a washer member 23 is placed on the opposite exposed sides of the aligned holes in the respective side rails 16 and corner stakes 14 whereupon a cotter pin 25 is inserted therethrough with the closed head on the outer surface of the respective side rail 16. The open ends of the respective cotter pins 25 are thereupon moved to the open or spread condition as seen in FIGS. 3 and 4 to secure the side rail 16 to the respective corner stake 14. When this has been done for each pair of the corner stakes 14, it is seen that these pairs are then interconnected as previously described by also parallel, spaced three of the side rails 16 and interconnected the same through the connecting means 15 but having the respective side rails 16 offset downwardly as seen in FIG. 1 so as to provide for the folding and storage conditions of this invention.

In the use and operation of the collapsible plant stake assembly 12 of this invention, it is obvious the same can be easily moved to the open position of FIG. 1 whereupon when the upper and lower ends of the corner stakes 14 are placed in respective, parallel planes. The collapsible plant stake assembly 12 assumes a generally square shape to be placed about a tomato plant or the like. On removing the same at the end of the growing season for storage purposes, it is seen that an opposed pair of the corner stakes 14 can be moved upwardly relative to the other stationary corner stakes 14 so as to be in abutting engagement therewith as shown in FIG. 6. In this single fold condition, it is obvious that the uppermost one of the side rails 16 can thereupon be placed over a supporting nail or hook for storage of the same on a wall or the like in a compact flat condition.

Additionally, assuming the condition of FIG. 6, it is obvious that the opposed adjacent pairs of the corner stakes 14 can be moved upwardly relative to the other stationary corner stakes to assume the condition of FIG. 5. In this dual fold condition, it is seen that there is a separate upper and lower, respectively, corner stakes 14 whereupon all of the corner stakes 14 achieve an adjacent abutting condition relative to each other whereupon the same takes up a minimum amount of space possible as seen on a horizontal cross section taken therethrough. This is desirable for hanging the same on a nail or the like in a storage area by taking up a minimum amount of space and achieving a neat appearing, most compact structure with a minimum amount of space.

Another desirable storage condition is illustrated in FIG. 7, known as a dual fold or compact storage condition. This condition is readily achieved on assuming the collapsible plant stake assembly 12 in the condition of FIG. 1 whereupon diagonally opposed ones of the corner stakes 14 are simultaneously moved upwardly relative to the stationary ones of the other corner stakes 14. This upward movement immediately causes a lateral movement of all of the corner stakes 14 into an adjacent compact structure having all of the corner stakes 14 in an abutting relationship without any waste of space as shown taken through a mid-portion horizontal cross section. However, it is seen that this condition of FIG. 7 varies from FIG. 5 in that upper and lower opposed pairs of the corner stakes 14 are positioned in identical positions vertically therefor having two of the corner stakes 14 extended downwardly for vertical support. It is seen that the compact storage condition of FIG. 7 does not take up as much vertical space as that of FIG. 5 and additionally has two points of vertical support for storing the same as in the corner of a storage cabinet or the like not requiring other additional means of support.

Another embodiment of this invention is illustrated in FIG. 2 shown as a dual tiered collapsible plant stake assembly 69 having four of the upright corner stakes 14 interconnected as by a plurality of side rails 16 by the connecting means 15. It is seen that the main difference between this embodiment and the first previously described is wherein the same is provided with a pair of the side rails 16 interconnecting adjacent ones of the corner stakes 14 with the same still being pivotally movable into the previous conditions of FIGS. 5, 6 and 7. Also, the collapsible plant and stake assembly 69 is readily placed in the condition of FIG. 2 so as to be positioned about a tomato plant or the like for supporting the same in a conventional manner.

It will be apparent from the foregoing description of the applicant's collapsible plant stake assembly, relatively inexpensive means have been provided for anchoring to a supporting ground surface and additionally attaching a growing plant thereto. Additionally, the collapsible plant stake assembly of this invention is readily movable into various collapsed conditions for hanging or standing the same for storage purposes. It is noted that this invention can be constructed of wood, aluminum or other such materials to be durable to weather conditions and sturdy in construction. The collapsible plant stake assembly of this invention is economical to manufacture, simple to use, substantially maintenance free, and readily movable from usage to storage conditions.

While the invention has been described in conjunction with preferred specific embodiments thereof, it will be understood that this description is intended to illustrate and not to limit the scope of the invention, which is defined by the following claims.

I claim:
1. A collapsible support assembly, comprising:
   (a) four spaced corner support members,
   (b) a plurality of side rails, and
   (c) means pivotally connecting the opposite end sections of said side rails against the outer surfaces in common planes of respective adjacent ones of said support members to form a continuously peripherally interconnected support assembly whereby said support members are movable from a spaced usage condition having said side rails extended in horizontal planes to a storage condition whereupon said support members are in abutting relationship so as to take up a minimum amount of space.
2. A support assembly as described in claim 1, wherein:
   (a) said support members having one in each corner connected by said side rails being of equal length whereupon when said side rails are in horizontal planes to define a square cage, open area in a horizontal plane between said corner, support members, and
   (b) said outer surfaces of adjacent ones of said corner support members in a common plane interconnected by three spaced parallel ones of said side rails spaced relative to each other so as to allow pivotal movement of said corner support members inwardly towards each other into a compact storage condition.
3. A support assembly as described in claim 1, wherein:
   (a) said support members each having one end tapered for securing purposes, and
   (b) said side rails having two of same secured against said outer surfaces in parallel planes of respective adjacent ones of said corner support members to form a square cage area in a horizontal plane between said corner support members when in the fully extended condition for supporting a plant therebetween, and opposed pairs of said corner support members to folded condition for hanging in a storage condition and diagonally opposed ones of said corner support members are movable upwardly relative to the other ones of said corner support members into a compact storage condition having the lowermost of two said corner support members supported on a supporting surface in a common plane for storage purposes.

References Cited

UNITED STATES PATENTS

| | | | |
|---|---|---|---|
| 374,906 | 12/1887 | Rovane | 47—47 |
| 1,353,670 | 9/1920 | Straith | 211—178 |
| 3,113,400 | 12/1963 | Emond | 47—45 |

FOREIGN PATENTS

| | | | |
|---|---|---|---|
| 458,514 | 12/1936 | Great Britain | 47—47 |
| 597,658 | 1/1948 | Great Britain | 211—178 |

ROBERT E. BAGWILL, Primary Examiner

U.S. Cl. X.R.

211—178; 248—166